United States Patent [19]

Goebels

[11] 4,153,307
[45] May 8, 1979

[54] WHEEL LOCK PREVENTION APPARATUS

[75] Inventor: Hermann J. Goebels, Schwieberdingen, Fed. Rep. of Germany

[73] Assignee: Robert Bosch GmbH, Stuttgart, Fed. Rep. of Germany

[21] Appl. No.: 800,598

[22] Filed: May 25, 1977

[30] Foreign Application Priority Data

Jun. 5, 1976 [DE] Fed. Rep. of Germany ....... 2625502

[51] Int. Cl.² .............................................. B60T 8/04
[52] U.S. Cl. .................................................. 303/119
[58] Field of Search ............................. 303/40, 61–63, 303/118, 119, 113

[56] References Cited

U.S. PATENT DOCUMENTS

| | | | |
|---|---|---|---|
| 3,910,648 | 10/1975 | Riesenberg | 303/119 |
| 3,913,983 | 10/1975 | Sekiguchi | 303/119 |
| 4,022,514 | 5/1977 | Kondo et al. | 303/119 X |
| 4,025,127 | 5/1977 | Rembold | 303/119 X |

*Primary Examiner*—Duane A. Reger
*Attorney, Agent, or Firm*—Edwin E. Greigg

[57] ABSTRACT

A wheel lock prevention apparatus for the brakes of a motor vehicle having a common control of the pressure applied to the brake cylinders of a particular vehicle axle in which a 3/2-way valve is arranged to control pressure in the line leading to the respective wheel cylinders with individual 2/2-way valves located in another line between the respective brake cylinders and ahead of the 3/2-way valve.

6 Claims, 5 Drawing Figures

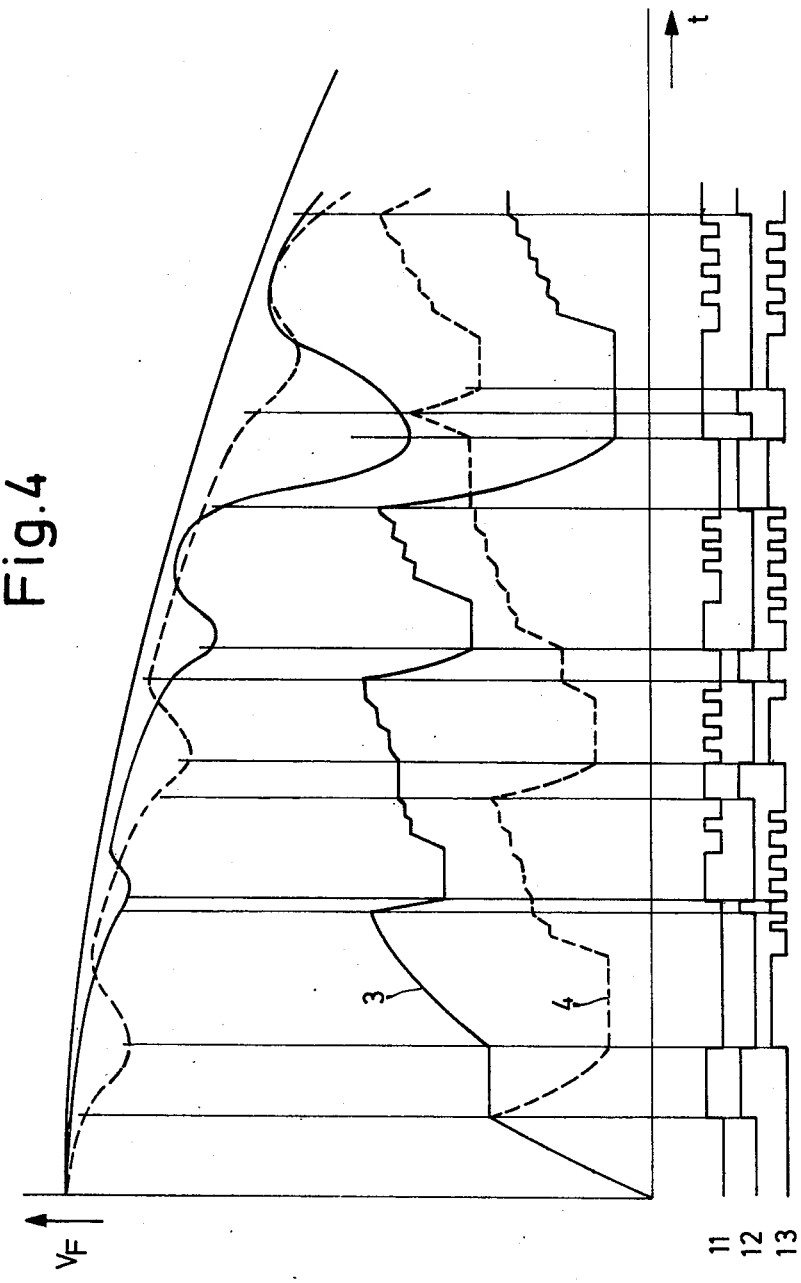

WHEEL LOCK PREVENTION APPARATUS

BACKGROUND OF THE INVENTION

The invention relates to wheel lock prevention systems, sometimes called anti-skid systems. It is a common fault of known systems of this type, e.g., that described in the German Offenlegungsschrift No. 2 212 566, that distinct underbraking or overbraking of individual wheels occurs on asymmetric roadbed surfaces and also with unsymmetric vehicle brakes. These conditions then result in unacceptably long braking distances or in very poor lateral guidance.

The idea as to how to control each wheel individually in order to alleviate the known disadvantages mentioned above, has long been sought after, but all such apparatuses entail added effort and expense.

OBJECT AND SUMMARY OF THE INVENTION

It is a principal object of the present invention to provide an apparatus capable of monitoring each of the two brake cylinders of a given vehicle axle individually by means of a simple axle-based control in spite of the omission and consequent savings of at least one valve, compared to an apparatus having individual wheel-based monitoring. This and other objects are attained, according to the present invention, by providing a brake lock-up prevention apparatus for wheels in which the brake pressure in the two brake cylinders of a given axle of a vehicle are controlled jointly. Only a single 3/2-way valve is therein used for the two brake cylinders and it is followed by one individual 2/2-way valve for each of the brake cylinders. Each such 3/2-way valve or 2/2-way can be preceded by a 3/2-way precontrol valve which performs the function of a pilot valve. In addition, the 3/2-way valve can be embodied as a relay valve. Finally, where it is desired to use the apparatus with hydraulic brakes magnetic valves can be used for the 3/2-way valve and for the two 2/2-way valves.

Each of the two brake cylinders can be controlled individually by means of the apparatus disclosed herein in spite of the omission, and consequent savings, of at least one valve compared to an apparatus having individual wheel control. An advantage of the teaching of this invention when applied to air pressure brakes is that one main valve and one pre-control magnetic valve are unnecessary for each given axle.

Solely in the pressure descent phase of the one brake cylinder is the pressure buildup of the other brake cylinder interrupted for the duration of the descent time, by means of a holding phase. The underbraking necessarily caused by means of this compulsive holding phase is, however, negligibly small because during a full regulation cycle the time component of the actual pressure descent phase, and therewith the holding phase compulsively applied to the other wheel, amounts only to 10–20%. Of course, the present apparatus also permits a simultaneous pressure decrease in both of the two given brake cylinders.

It is another advantage that a distinct improvement of the vehicular running stability is achieved by this form of brake pressure modulation. The momentary interruption of the pressure buildup at the one wheel at the instant when the other wheel of the jointly regulated axle became unstable causes the effect that the individual monitoring cycles of the wheels of a given axle are usually mutually phase-shifted. At least one wheel of the given axle is thereby always put in the optimal and stable slippage region.

A further advantage of this axle-based pressure modulation, which automatically switches the other wheel to a pressure holding state upon a pressure reduction at one given wheel, is the consequently weakened effect during suddenly changing roadbed conditions. In this manner, extreme changes of the torque about the vertical vehicle axis caused by suddenly changing roadbed asymmetries or also caused at the start of braking on an asymmetric roadbed can be better equalized through corresponding steering corrections (yaw moment equalization).

The invention will be better understood as well as further objects and advantages thereof become more apparent from the ensuing detailed description of three preferred and exemplary embodiments taken in conjunction with the drawing.

BRIEF DESCRIPTION OF THE DRAWING

FIGS. 1A–1C show three operating positions of the embodiment of FIG. 1.

FIG. 4 shows diagrammatically the control system for a brake lock-up prevention apparatus.

FIGS. 5A–5C show three operating positions of the embodiment of FIG. 5.

DETAILED DESCRIPTION OF THE PREFERRED EMBODIMENT

Figure 1:
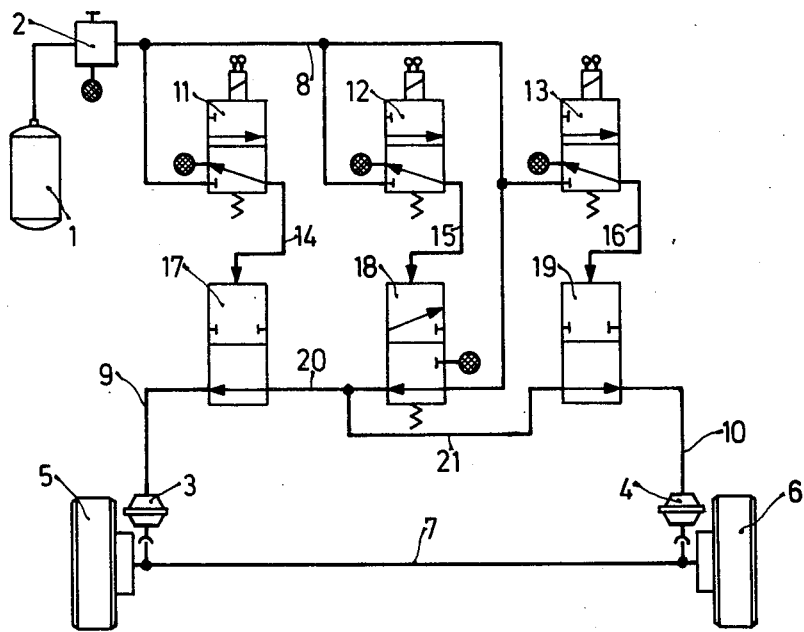
FIG. 1 shows schematically one embodiment of a lock-up prevention apparatus for a vehicle having a pressurized air brake system.

Turning now to the drawings, a pressurized air storage container 1 is shown connected with a brake valve 2 the function of which is to supply two brake cylinders 3 and 4 each of which in turn actuate the brakes of the vehicle wheels 5 and 6 that are supported adjacent to the end of the vehicle axle 7.

With particular reference to FIG. 1 there is shown a feed line 8 that communicates with three precontrol 3/2-way magnetic valves 11, 12 and 13, each of which control the lines 14, 15 and 16 which lead to main valves 17, 18 and 19.

The main valve 18 it will be observed is directly connected to the line segment 8 and thus has a direct connection to the brake valve 2. This main valve 18 is embodied as a 3/2-way valve and controls a branch line 20, which in turn leads to line 21, which extends to the other two main valves 17 and 19, each of which are merely 2/2-way valves.

It can be seen that in this manner the 3/2-way valve 18 is inserted into the line 8, 9, 10 which leads to the brake cylinders 3 and 4. Further, downstream of the 3/2-way valve 18 the brake line is conducted in the direction toward the brake cylinders 3 and 4 via the branch line 20, 21 and its communicating feed line feeds through main valve 19 to the brake cylinder 4, while the other extremity of line 20 feeds through the 2/2-way valve 17, and thus controls the brake cylinder 3.

Figure 2:
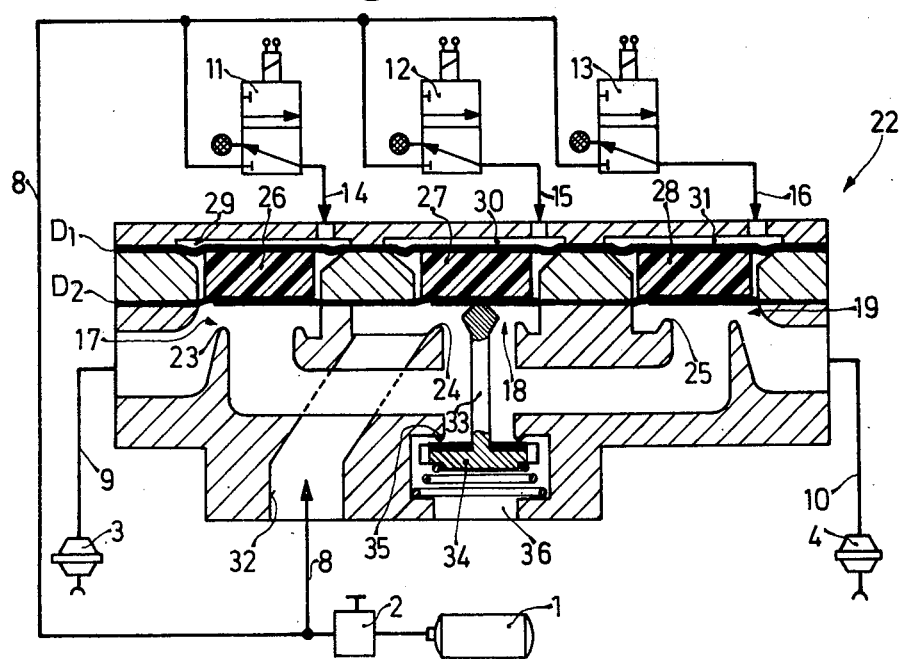
FIG. 2 shows in cross-section a 3/2-way valve and two 2/2-way valves of one valve assembly.

In FIG. 2 there is shown another embodiment of this invention wherein the main valves 17, 18 and 19 are combined into a unitary structure 22. This particular type of valve is arranged to have rigid floatable element 26, 27 and 28 arranged in a horizontal plane with each element spaced from one another and movably suspended in pockets formed between upper and lower diaphragms $D^1$ and $D^2$. As shown, the vertical movable elements 26, 27 and 28 constitute valve closure members which are arranged to cooperate with valve seats 23, 24 and 25. The line connections 14, 15, and 16 from the pre-control valves 11, 12, and 13 extend to working chambers 29, 30, and 31 which are bounded by the floating elements 26, 27, and 28.

The brake line 8 connects to a valve port 32 which leads to the valve seat 24 of the 3/2-way main valve 18 with a rod 33 arranged to penetrate the seat 24 and attached to the floatable diaphragm element 27. The rod 33 is provided at its other end with a spring loaded closure body 34 that forms together with an integral valve seat 35 of the housing 22 the outlet valve 34/35 of the 3/2-way valve 18 which controls an outside air junction 36. The apparatus described above operates as follows: During normal braking, a free brake line passage exists from the brake valve 2 via the brake line 8, 9, and 10 to the brake cylinders 3 and 4 so that the brake air pressure reaches the brake cylinders 3 and 4 via the 3/2-way valve 18, the line branches 20 and 21 and the two 2/2-way valves 17 and 18.

The operation of the lock-up prevention apparatus is now explained with reference to FIG. 4 which represents a diagrammatic view of the control system for the brakes. In this diagram the time is plotted along the abscissa and along the ordinate the brake pressure is plotted at the bottom (dashed line for the brake cylinder 4 and solid line for the brake cylinder 3) and the vehicle velocity as well as the wheel velocity, is plotted at the top.

FIG. 1A shows an application of the air pressure to the brake cylinders 3 and 4 of wheels 5 and 6. This is a typical braking application which results from the activation of brake valve 2 and absent on overbraking condition.

If a wheel is overbraked, for example, the wheel 6 with its brake cylinder 4, then the lock-up prevention apparatus responds and the pre-control valves 11 and 12 switch to their alternate state.

FIG. 1B shows the overbraking condition of wheel 6 (FIG. 4, curve 4). In this condition valves 11 and 12 are shifted, for example, electronically by a control circuit including a wheel speed sensor. The control circuit is well known and does not form part of the present invention. Shifting of the valves 11 and 12 pressurizes the lines 14 and 15, which in turn cause the valves 17 and 18 to shift. Valve 17 shifts to its blocking state, which insures that the pressure condition in line 9 is maintained. The 3/2-way main valve 18 is thereby switched to its alternate state and thus allows air to flow from the brake cylinder 4 to atmosphere. As noted above, the 2/2-way valve 17 simultaneously switches to its closed position so that the applied pressure is held in the brake cylinder 3 because this cylinder is presently not tending toward lock-up. At the end of the pressure descent phase of the brake cylinder 4, all of the pre-control valves 11, 12, and 13 switch states. The 3/2-way main valve 18 and the 2/2-way main valve 17 therefore switch to an air passage state which the pressure in brake cylinder 3 rises further, and the 2/2-way main valve 19 switches to a blocking state, so that the reduced brake pressure in brake cylinder 4 is held over. After a predetermined time, at the end of the holding phase, the precontrol valve 13 once again switched, so that the main valve 19 once again assumes its initial position for a pressure rise. The reduced brake pressure in brake cylinder 4 is once again increased, incrementally, by means of the switching of the pre-control valve 13. The subsequent brake pressure course is evident from the diagram.

FIG. 1C shows the condition at the end of the pressure descent phase of the brake cylinder 4 (FIG. 4). The valves 11–13 are shifted by the control circuit. This causes a shift back of the valves 17 and 18 and a shift to the blocking state of the valve 19 which holds the pressure in line 10 for a predetermined time. At the end of the predetermined time, valve 13 and consequently valve 19 are shifted back, and a condition preparatory to the condition of FIG. 1A is achieved.

It is advantageous from the teaching of this invention that the brake pressure reduction and the brake pressure buildup of the two brake cylinders 3 and 4 can be undertaken via the common 3/2-way main valve 18 and that the thereby achievable common brake pressure modulation which is accomplished by means of the pressurization and the venting of the brake cylinders 3 and 4, can, at any time, be interrupted by means of the serially arranged 2/2-way valves 17 and 19 in the lines leading to the respective brake cylinders. Accordingly, it is thereby made possible by this system to control each of the two brake cylinders 3 and 4 individually in spite of the omission, and consequent savings, of one valve compared to an apparatus which features individual wheel regulation. Solely in the pressure descent phase of a given brake cylinder 3 or 4 is the pressure buildup in the other given brake cylinder interrupted by means of the holding phase, for the short duration of the descent time.

It is, of course, also possible by means of the proposed apparatus to decrease the pressure in the two brake cylinders 3 and 4 simultaneously.

Figure 3:
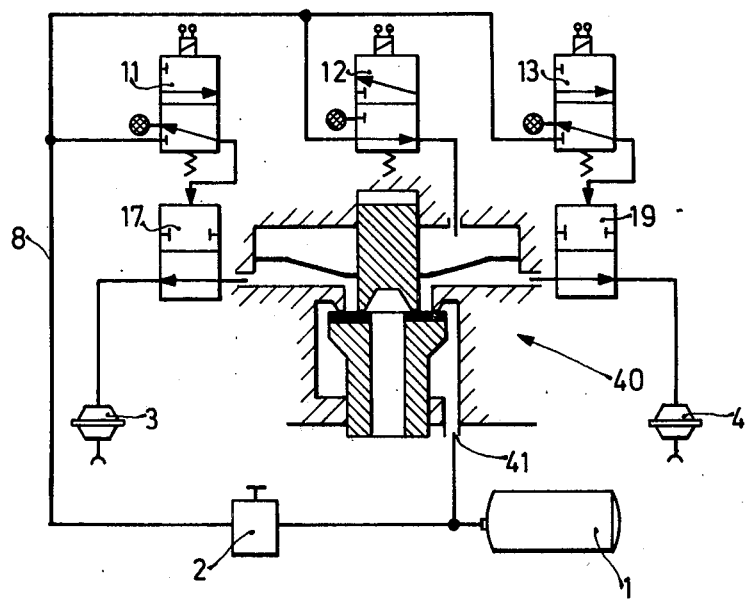
FIG. 3 shows a lock-up prevention apparatus in which the 3/2-way valve is embodied as a relay valve.

FIG. 3 shows a lock-up prevention apparatus, which also uses the same numerals earlier used for like parts, which is substantially the same as the apparatus according to FIGS. 1 and 2, except that here a 3/2-way main valve 40 is embodied as a relay valve having its own supply line access junction 41 which leads to tank 1.

Figure 5:
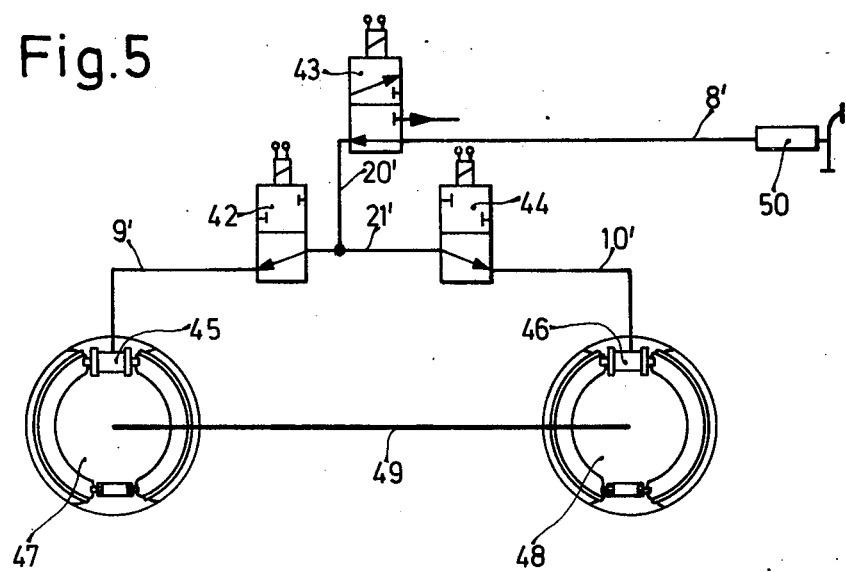
FIG. 5 shows schematically a lock-up prevention apparatus for a wheeled vehicle using hydraulic brakes.

Reference is now made to FIG. 5 where it shows that the proposed apparatus is particularly and advantageously applicable to a vehicle using hydraulic brakes. In such an apparatus the passages can be controlled directly by means of magnetic valves 42, 43, and 44, of which the precedingly interconnected magnetic valve 43 is embodied as a 3/2-way valve and the succeedingly interconnected magnetic valves 42 and 44 are embodied as 2/2-way valves. In this arrangement the two hydraulic brake cylinders 45 and 46 are assumed to be located at the wheels 47 and 48 having the common axle 49. The brake pressure is created by means of a hydraulic main cylinder 50 act which communicates with the brake line 8'.

FIG. 5A shows an application of hydraulic brake fluid to the brake cylinders 45 and 46 of wheels 47 and 48. This is a typical braking application which results from the activation of brake pedal and absent on overbraking condition. FIG. 5B shows an overbraking condition at wheel 48 (FIG. 4, curve 4). In this condition valves 42 and 43 are shifted, again electronically by a control circuit including a wheel speed sensor. Shifting of the valve 43 causes line 10' to be opened to the hydraulic fluid reservoir, which feeds the cylinder 50. In addition, valve 42 is shifted to its blocking state, which insures that the pressure condition in line 9' is maintained. FIG. 5C shows the condition at the end of the pressure descent phase of the brake cylinder 46 (FIG. 4). The valves 42, 43 and 44 are shifted by the control circuit. This causes a shift back of the valves 42 and 43 and a shift of the valve 44 to its blocking state, which holds the pressure in the line 10' for a predetermined time. At the end of the predetermined time, the valve 44 is shifted back and a condition preparatory to the condition of FIG. 5A is achieved.

The brake pressure modulation is carried out for these hydraulic brakes exactly as shown in the diagram of FIG. 4.

The described apparatus is especially advantageous due to the reduced expense resulting from the omission, and consequent savings, of a magnetic valve with its appertaining electrical driver stage, and for air pressure systems additionally due to the omission, and consequent savings, of a main valve.

Moreover, the brake pressure modulation made possible by means of the present apparatus offers functional advantages which could only be provided through added electronic apparatus to achieve a differing solution.

It is also advantageous that, during a pressure reduction at one wheel of a given axle, the other wheel is automatically switched to a pressure holding state. Extreme changes of the moments about the vertical vehicle axis caused by suddenly changing roadbed asymmetries, or also caused at the start of braking on an asymmetric roadbed, can be better equalized through corresponding steering corrections by the driver (yaw moment equalization).

Advantages also accrue through the improved lateral guidance forced by brake modulation according to the invention by brief pressure limiting of the "high" wheel in the lesser state of the "low" wheel.

In addition, the interruption of the pressure buildup at the one wheel which is being braked while the other wheel becomes unstable causes the individual regulation cycles of the commonly regulated axle to be mutually phase shifted, and thereby ensures that one wheel is always regulated to its optimal slippage state.

The low average current requirement, occasioned by the statistic fact that at most two magnets are being simultaneously actuated, is also advantageous.

In a variant embodiment of the apparatus, the two brake cylinders or groups of brake cylinders could also be divided up in a different manner, e.g., diagonally, instead of being associated with a common axle.

What is claimed is:

1. Wheel lock prevention apparatus for the brakes of a motor vehicle having a common control of the pressure applied to the brake cylinders of a given vehicle axle, the improvement wherein a 3/2-way valve is positioned in a brake line extending to the two brake cylinders associated with the respective wheels, said 3/2-way valve including a further brake branch line that extends to individual 2/2-way valves that are provided in the control system between said first 3/2-way valve and said respective brake cylinders.

2. Wheel lock prevention apparatus as claimed in claim 1, in which each said valve is arranged to be actuated by means of individual 3/2-way magnetic valves which comprise a pre-control valve means.

3. Wheel lock prevention apparatus as claimed in claim 1, in which the 3/2-way valve is a relay valve.

4. Wheel lock prevention apparatus as claimed in claim 2, in which the 3/2-way valve is a relay valve.

5. Wheel lock prevention apparatus as claimed in claim 1, in which during the pressure maintenance phase of a brake cylinder, the pressure increase in the other brake cylinder could be interrupted by a holding phase.

6. Wheel lock prevention apparatus as claimed in claim 1, in which during the pressure descent phase of a brake cylinder, the pressure increase in the other brake cylinder is interrupted by a holding phase.

* * * * *